United States Patent
Szeliski et al.

(10) Patent No.: US 6,215,496 B1
(45) Date of Patent: Apr. 10, 2001

(54) SPRITES WITH DEPTH

(75) Inventors: Richard S. Szeliski, Bellevue; Michael F. Cohen, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/121,797

(22) Filed: Jul. 23, 1998

(51) Int. Cl.[7] .................................................. G06F 15/00

(52) U.S. Cl. ............................................................ 345/419

(58) Field of Search ..................................... 345/418, 419, 345/421, 422, 425, 113, 114

(56) References Cited

U.S. PATENT DOCUMENTS 5,977,980 * 11/1999 Aleksicy ............................. 345/422

* cited by examiner

Primary Examiner—Phu K. Nguyen
(74) Attorney, Agent, or Firm—ipsolon llp

(57) ABSTRACT

A sprite data structure includes multiple pixels that each have conventional image information (e.g., color and transparency) relating to the appearance of the sprite. The data structure of each pixel includes a depth component or value representing a displacement of the pixel from a selected plane. In a sprite rendering process, the depth values of an input or source sprite are forward mapped (i.e., warped) to the depth values of an output or a destination sprite. Based upon the forward mapping of the depth values in the destination sprite, a backward mapping is performed on the image information from the source sprite to the destination sprite so that it can be rendered. This provides the destination sprite with parallax-based offsets that can create a very strong impression of three-dimensionality between and within the sprites.

37 Claims, 11 Drawing Sheets

SOURCE/INPUT          DESTINATION/OUTPUT

SOURCE/INPUT    DESTINATION/OUTPUT

Fig. 7
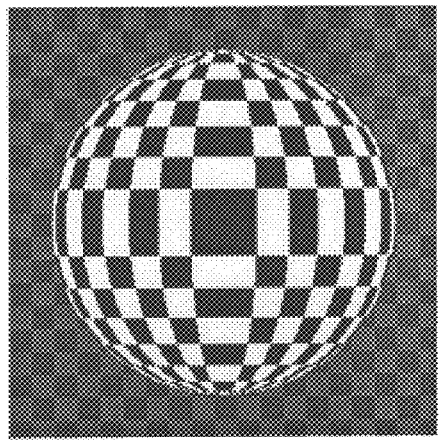
IMAGE DATA
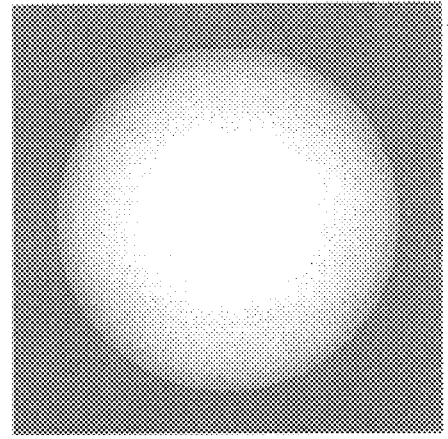
DEPTH/
DISPLACEMENT
MAP

Fig. 10
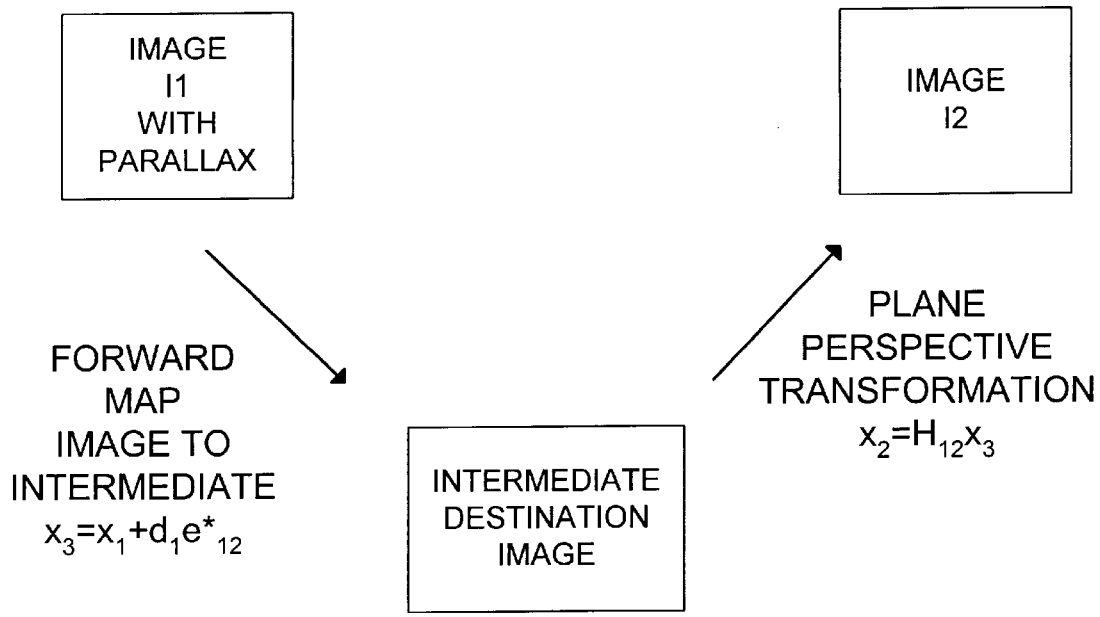
Fig. 11
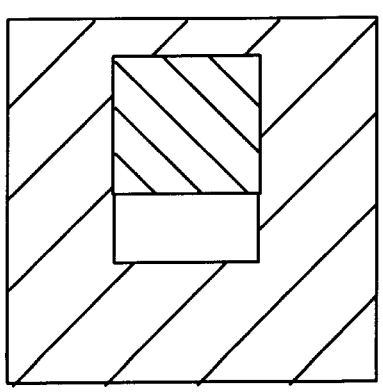
PARALLEL DISPLACEMENTS
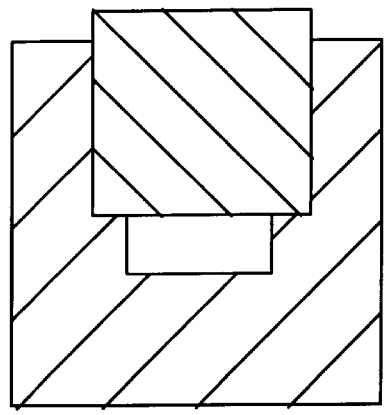
TRUE LOOMING Fig. 13A
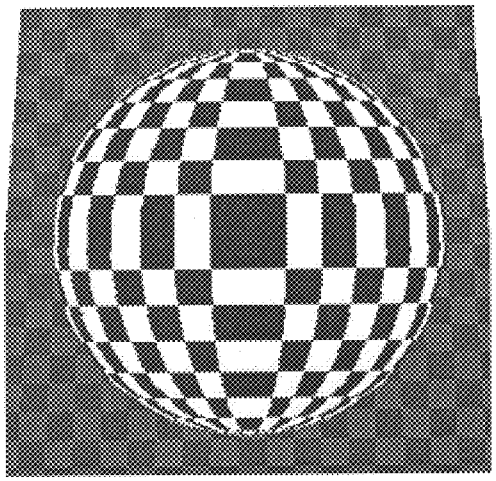
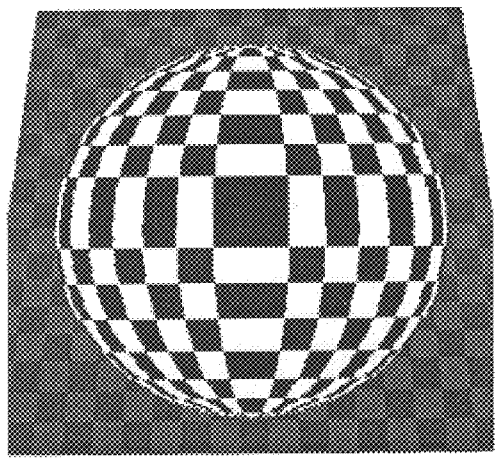
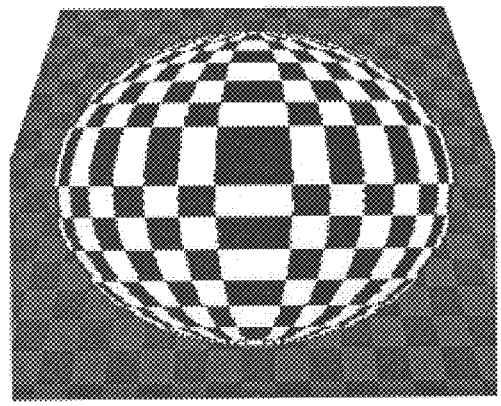

Fig. 13B
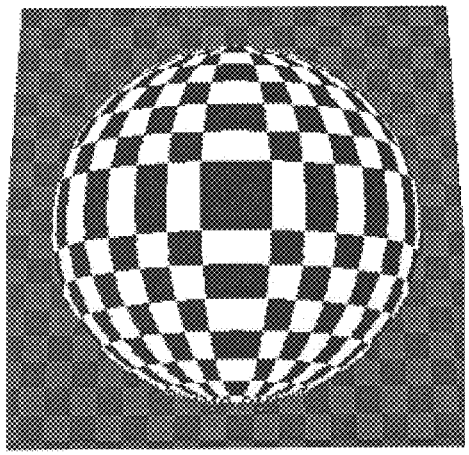
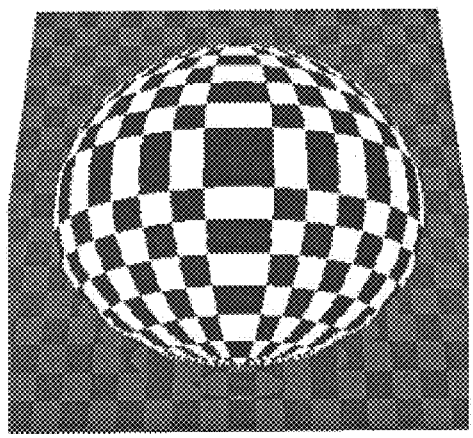
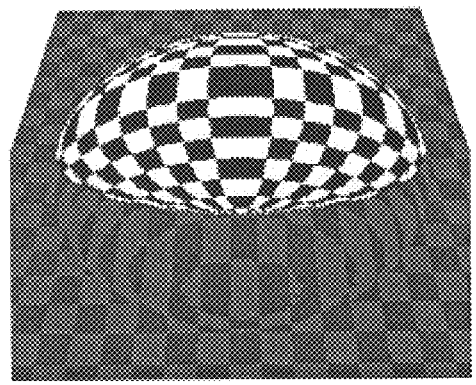

Fig. 13C
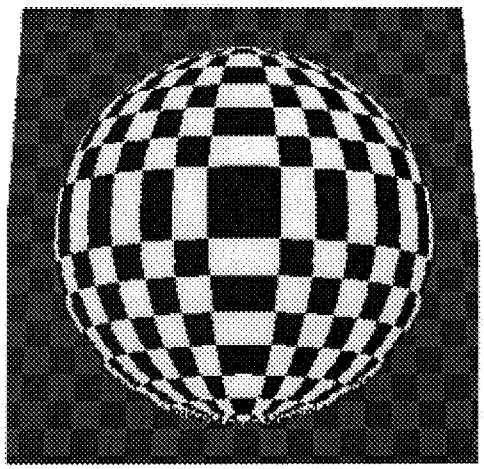
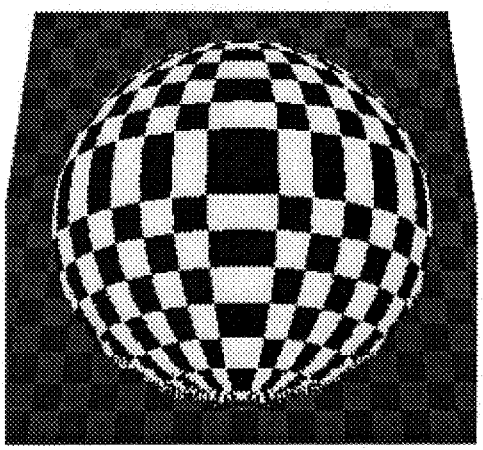
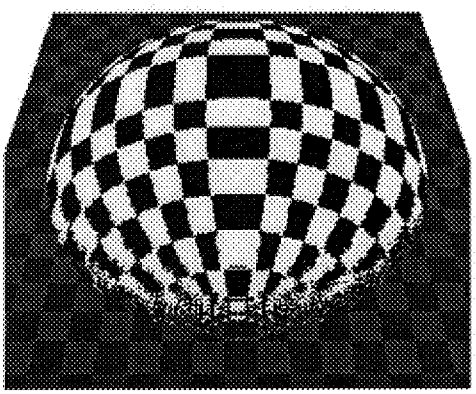

SPRITES WITH DEPTH

FIELD OF THE INVENTION

The present invention relates to rendering images or sprites that include depth components in their representation and using the depth components in mapping the sprites to render images more efficiently and with greater realism.

BACKGROUND AND SUMMARY OF THE INVENTION

Image based rendering (IBR) techniques are an efficient way of generating novel views of real (e.g., photographic) and synthetic (i.e., computer-generated) objects. With traditional rendering techniques, the time required to render an image increases with the geometric complexity of the scene. The rendering time also increases as the requested shading computations (such as those requiring global illumination solutions) become more ambitious.

A simple example of image based rendering is the use of sprites. Once a complex scene has been rendered from a particular point of view, pieces of the image that correspond to spatially coherent objects will likely look similar from nearby points of view, although each piece may move at a different rate or direction. In this case, the pieces of the original 2D image (sprites) can be slightly altered by an affine or projective transformation to approximate the view from the new camera position. The sprite approximation's fidelity to the correct new view is dependent on the geometry being represented and, in particular, the amount of out-of-plane depth variation in the real scene piece being re-rendered. Another example of image based rendering is to add depth information to an image to produce a depth image. The optical flow that would be induced by a camera shift is then used to warp the scene into an approximation of the new view.

Each of these two methods has its limitations. Simple sprite warping cannot produce the parallax that is produced when parts of the scenes have sizable differences in distance from an approximating plane. Flowing a depth image pixel by pixel can provide proper parallax, but may result in gaps in the image either due to visibility changes when some previously occluded portion of the scene becomes unoccluded, or when a surface is magnified in the new view.

Some solutions have been proposed to the latter problem. One suggested solution is to perform a backward mapping from the output sample location to the input image. This is an expensive operation that requires some amount of searching in the input image. Another possible solution is to treat the input image as a mesh of micro-polygons, and to scan-convert these polygons in the output image. This too is an expensive operation, as it requires a polygon scan-convert setup for each input pixel, an operation that would be difficult without specialized rendering hardware. A third possibility is to simplify the depth component of the depth image, say into larger triangles, and to then use regular texture-mapping hardware or software. However, such a simplified description may fail to capture fine details in the depth map, and also complicates the representation required for the depth image.

This invention provides sprite rendering processes that overcome these limitations and a sprite image data structure that supports these processes. A conventional sprite data structure includes multiple pixels that each have image information (e.g., color and transparency) relating to the appearance of the sprite. The data structure of this invention adds to each pixel a depth component or value representing a displacement of the pixel from a selected plane. The depth components may be included as a separate channel in the conventional sprite data structure or as a separate image.

In one implementation of a sprite rendering process, the depth values of an input or source sprite are forward mapped (i.e., warped) to the depth values of an output or a destination sprite. For many applications of sprites with depth, the depth map will typically vary more slowly or smoothly than the color/intensity distribution. Moreover, motion due to depth parallax will typically be smaller than motion due to the plane perspective transform. These two effects combined make small errors in forward depth mapping much less visible than errors in forward color mapping.

Based upon the forward mapping of the depth values in the destination sprite, a backward mapping is performed on the image information from the source sprite to the destination sprite so that it can be rendered. This provides the destination sprite with parallax-based offsets that can create a very strong impression of three-dimensionality between and within the sprites.

The simplicity and regularity of the process make it a natural candidate for hardware implementation. Thus, the sprite-with-depth data structure could become a new rendering primitive in standard 3D graphics system. Other implementations include factoring the forward mapping into a pure parallax warp followed by a backward global perspective transform, adding a per-pixel parallax correction to the backward mapping process, and forward warping a displacement (flow) map. All of these implementations can be used to generate more realistic renderings of a sprite when it is viewed from different angles.

Additional objects and advantages of the present invention will be apparent from the detailed description of the preferred embodiment thereof, which proceeds with reference to the accompanying drawings.

BRIEF DESCRIPTION OF THE DRAWINGS

FIG. 7 is a graphical illustration of image data and the corresponding depth or displacement map representing a spherical bump on a flat plane.

FIG. 10 is a graphical illustration of the sprite rendering method of FIG. 9.

FIG. 11 illustrates image effects of parallel displacement vectors.

FIGS. 13A–13C are graphical illustrations showing images rendered with a conventional flat sprite and images rendered with sprites having depth corrections.

DETAILED DESCRIPTION OF PREFERRED EMBODIMENTS

Figure 1:
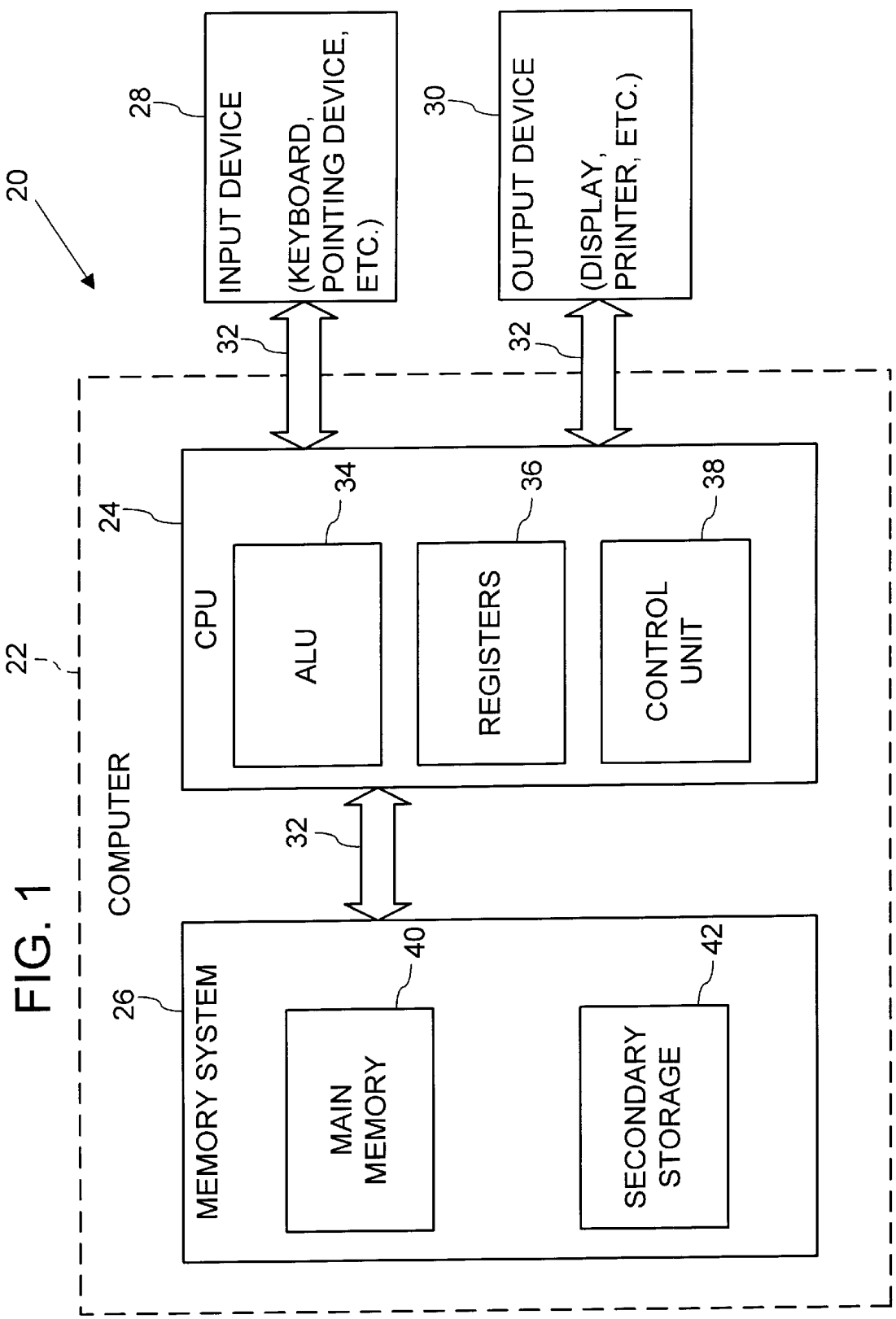
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Sprites are texture maps or images with pixels rendered onto planar surfaces (e.g., display screens). Sprites may be real or synthetic image objects and are most effective at representing scene components which are either planar (or nearly so), such as building facades and the ground plane, or objects very far away from the viewer (in which case they play a similar role as environment maps). Layering several sprites together into a scene can create a strong impression of three-dimensionality, because of the relative motion (parallax) between the different sprite "layers". This has been used extensively in cel animation and is known as multi-planing.

When a 2D image of a complex scene is rendered from a particular point of view, the image that would be created from a nearby point of view will typically be similar. The original 2D image, or sprite, can be slightly altered by an affine or projective transformation to approximate the new point of view, which is also called a camera position.

The accuracy with which the sprite approximation represents the new view is dependent on the geometry being represented. Typically, errors in the approximation increase with the amount of depth variation in the scene represented by the sprite. The amount of the difference between the points of view (i.e., the camera motion) also increases the error. Each pixel has a transparency characteristic represented by an alpha value, as is known in the art. Sprites may be used either for locally caching the results of a slower renderer and then generating new views by warping, or they can be used directly as drawing primitives (e.g., as in video games).

The texture map associated with a sprite can be computed by simply choosing a 3D viewing matrix and projecting some portion of the scene onto an image plane. In practice, a view associated with a current or an expected viewpoint is a good choice. A 3D plane equation can also be computed for the sprite, e.g., by fitting a 3D plane to the z-buffer values associated with the sprite pixels.

The descriptive power or realism of sprites can be enhanced by adding out-of-plane depth components or values $d_1$ at each pixel in the sprite. The $d_1$ depth values can be stored in a separate channel or as a separate image. The depth map could be at a lower spatial resolution than the color image (e.g., 8-bit signed depths) or at the same resolution. The full precision of a traditional z-buffer is not required because the depths are used only to determine local parallax and not to perform z-buffer merging of primitives. Hence, the $d_1$ values or "image" could be stored at a resolution lower than the color image characteristics of the sprite.

A sprite is represented by a transparency- or an alpha-matted image $I_1(x_1)$, a 4×4 camera matrix $C_1$ that maps from 3D world coordinates $(X, Y, Z, 1)$ into the sprite coordinates $(x_1, y_1, z_1, 1)$ to form an initial view of the sprite and, a plane equation $z_1 = a_1 x_1 + b_1 y_1 + c_1 + s_1 d_1$, where $d_1$ is an optional per-pixel out-of-plane displacement or depth. For example, $d_1 = 0$ for pixels on the plane, and for pixels off the plane, $d_1$ is the scaled perpendicular distance to the plane divided by a distance $w_1$ of the pixel to the camera represented by camera matrix $C_1$. (For example, the scale factor is 1 if $A^2 + B^2 + C^2 = 1$.)

The camera matrix $C_1$ is the conventional concatenation of the viewport, projection, and geometric transformations. The camera matrix $C_1$ may be expressed as:

$$C_1 = \begin{bmatrix} Sx & 0 & 0 & Cx \\ 0 & Sy & 0 & Cy \\ 0 & 0 & 0 & 0 \\ 0 & 0 & 0 & 1 \end{bmatrix} \begin{bmatrix} 1 & 0 & 0 & 0 \\ 0 & 1 & 0 & 0 \\ 0 & 0 & 0 & 1 \\ 0 & 0 & 1 & 0 \end{bmatrix} \begin{bmatrix} R11 & R12 & R13 & t1 \\ R21 & R22 & R23 & t2 \\ R31 & R32 & R33 & t3 \\ 0 & 0 & 0 & 1 \end{bmatrix}$$

where S and C in the first matrix represent camera scaling and center transformations, the second matrix represents a perspective transformation, and R and t in the third matrix represent rotation and translation. As applied to a point X in 3D homogeneous world coordinates, represented by a vector (X, Y, Z, 1), the camera matrix $C_1$ provides a 2D pixel in the camera view.

$$\begin{bmatrix} w_1 x_1 \\ w_1 y_1 \\ w_1 z_1 \\ w_1 \end{bmatrix} = C_1 \begin{bmatrix} X \\ Y \\ Z \\ 1 \end{bmatrix}$$

The plane equation is given in the coordinate system of the camera for the sprite, and can be computed using a least squares fit to the z-buffer values of the sprite (i.e., the $z_1$ values), as is known in the art. The factor s in the plane equation is a scale that can be set so that the d values are within a selected range (e.g., ±127 for 8-bit displacements). The d values can be set to an arbitrary value for invisible parts of the sprite (where transparency $\alpha$=0); in practice, setting them to be continuous with their neighbors may be advantageous to reduce re-sampling errors when mapping depths, as described in greater detail below.

Figure 2:
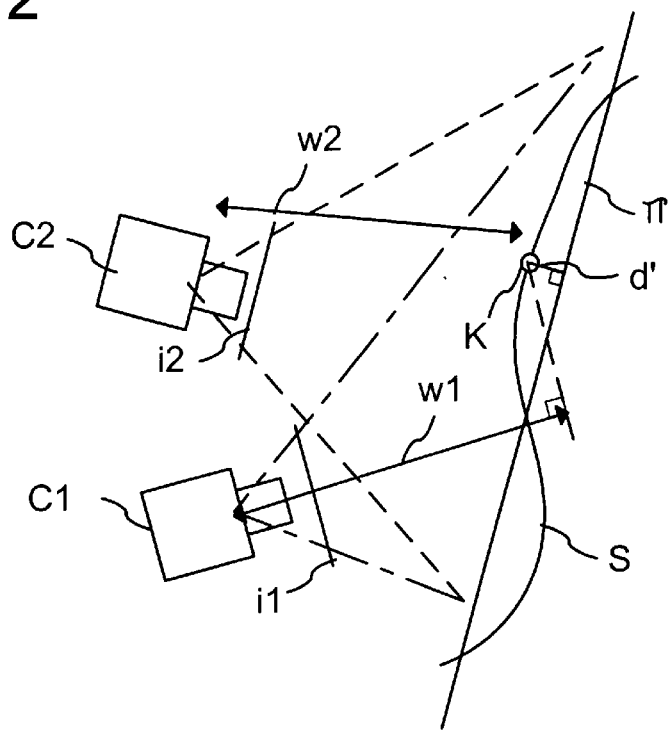
FIG. 2 is a diagram illustrating the imaging of a pixel on a 3D object or sprite surface by a pair of cameras.

FIG. 2 is a diagram illustrating the imaging of a pixel K on a 3D object or sprite surface S (shown in 2D as a curved line) by a pair of cameras C1 and C2. Cameras C1 and C2 form 2D images of surface S, including pixel K, which images represent different views of surface S. The different images may result, for example, from motion of the sprite or from motion of the point-of-view relative to the sprite.

The sprite surface S within the views of cameras C1 and C2 has an arbitrary shape for which the plane equation $z_1 = a_1 x_1 + b_1 y_1 + c_1 + s_1 d_1$ (e.g., using a least squares fit) defines a plane $\pi$ (shown in 2D as a straight line). The pixel K is displaced from plane $\pi$ by a depth d' that is perpendicular to plane $\pi$. The images formed by cameras C1 and C2 are formed on respective image planes i1 and i2. The image of pixel K formed by camera C1 is represented as a location $x_1$ and $y_1$ on image plane i1 with a depth displacement $d_1$. Similarly, the image of pixel K formed by camera C2 is represented as a location $x_2$ and $y_2$ on image plane i2 with a depth displacement $d_2$. The depth displacements have the following relationships:

w1 $d_1$=d' w2 $d_2$=d'

Accordingly, the 2D transformation associated with a new view $C_2$ is determined as a mapping between pixels ($x_1$, $y_1$, $z_1$, 1) in the sprite and pixels ($w_2 x_2$, $w_2 y_2$, $w_2 z_2$, $w_2$) in the output camera's image, which mapping is given by a transfer matrix $S_{1,2} = C_2 C_1^{-1}$. With the out-of-plane displacement used to write the sprite pixel as ($x_1$, $y_1$, 1, $d_1$), and matrix $P_1$ representing the plane equation $z_1 = a_1 x_1 + b_1 y_1 + c_1 + s_1 d_1$, the transfer matrix becomes $T_{1,2} = C_2 C_1^{-1} P_1$, where $$\begin{bmatrix} w_2 x_2 \\ w_2 y_2 \\ w_2 d_2 \\ w_2 \end{bmatrix} = T_{1,2} \begin{bmatrix} x_1 \\ y_1 \\ d_1 \\ 1 \end{bmatrix} \quad (0)$$

$$\begin{bmatrix} x_1 \\ y_1 \\ z_1 \\ 1 \end{bmatrix} = \frac{T_{1,2}}{C_2 C_1^{-1}} \begin{bmatrix} x_1 \\ y_1 \\ 1 \\ d_1 \end{bmatrix} = P_1 \begin{bmatrix} x_1 \\ y_1 \\ 1 \\ d_1 \end{bmatrix}$$

$$P_1 = \begin{bmatrix} 1 & 0 & 0 & 0 \\ 0 & 1 & 0 & 0 \\ a_1 & b_1 & c_1 & s_1 \\ 1 & 0 & 1 & 0 \end{bmatrix}$$

For a flat sprite ($d_1$=0), the transfer equation can be written as $$\begin{bmatrix} w_2 x_2 \\ w_2 y_2 \\ w_2 \end{bmatrix} = H_{1,2} \begin{bmatrix} x_1 \\ y_1 \\ 1 \end{bmatrix}$$

where $H_{1,2}$ is the 2D planar perspective (i.e. homographic) transformation obtained by dropping the third row and last column of $T_{1,2}$. The coordinates ($x_2$, $y_2$) obtained after dividing out the $w_2$ index is a pixel address in the output camera's image. The factor $w_2$ is the distance of the pixel to the camera represented by camera matrix $C_2$. Efficient backward or inverse mapping techniques exist for performing the 2D perspective warp, or texture mapping hardware can be used.

Backward mapping is one type of spatial transformation that defines a geometric relationship between each point in an input image and an output image. An input image is made up of points with coordinate values that are known. An output image is made up of points that are observed, determined, or "warped." The transformation may be a forward mapping that maps the input coordinate system to the output coordinate system, or a backward mapping that maps the output coordinate system onto the input coordinate system. Forward mapping pushes pixels from the source (original) image to the destination (new) image, using a mapping that specifies the destination pixel address for each source pixel. Backward mapping pulls pixels from the source to the destination, using a mapping that specifies the source pixel address for each destination pixel.

Figure 3:
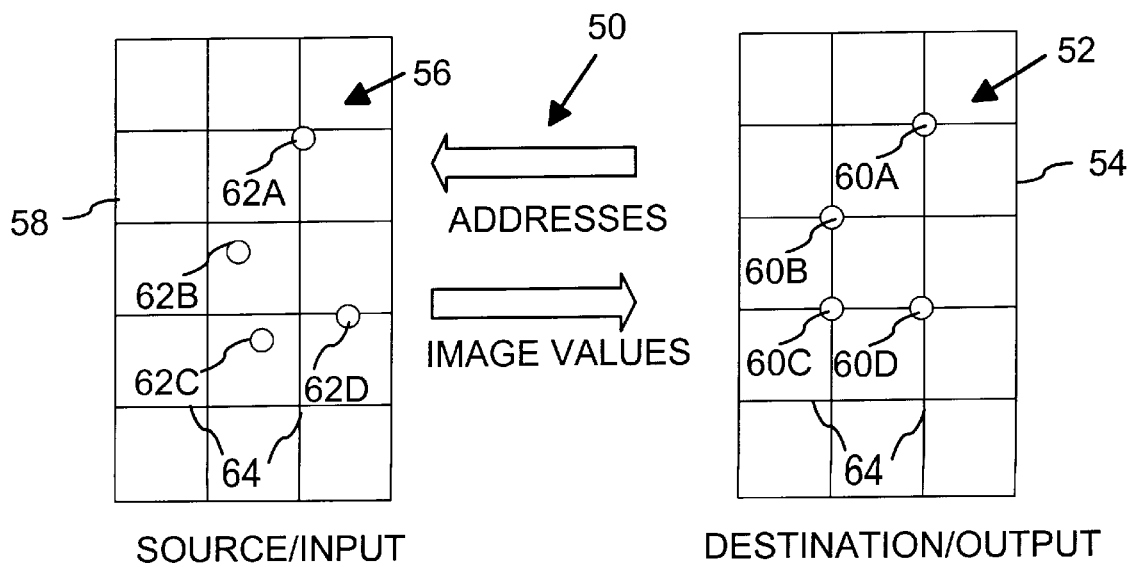
FIG. 3 is a diagram illustrating a backward or inverse mapping of a sprite in a destination or an output image to a corresponding sprite in a source or an input image (e.g., image frame).

FIG. 3 is a diagram illustrating a backward or inverse mapping 50 of a sprite 52 in a destination or an output image (e.g., image frame) 54 to a corresponding sprite 56 in a source or an input image (e.g., image frame) 58. For purposes of illustration, sprites 52 and 56 are simple geometric shapes formed by pixels 60A–60D and pixels 62A–62D, respectively. It will be appreciated that sprites 52 and 56 could be synthetic or real (world) images having arbitrary numbers of pixels.

Pixels 60A–60D of sprite 52 are located at integer value pixel positions corresponding to actual image pixel locations that are represented by intersections of lines 64. Backward mapping 50 maps the addresses of pixels 60A–60D to corresponding respective pixels 62A–62D in sprite 56. The transformation or mapping provided by backward mapping 50 will often map pixels 62A–62D to real value pixel positions that are located between the actual image pixel locations represented by intersections of lines 64, and so pixels 62A–62D are interpolated from values at integer pixel locations, as is known in the art. The interpolated image values at pixel locations 62A–62D are then mapped back to the corresponding pixels 60A–60D.

Backward mapping 50 may be represented mathematically as follows. Given a source or an input sprite or image $I_1(x_1)$ and a coordinate mapping $x_1=f(x_2)$, a destination or output sprite or image $I_2(x_2)$ is represented as $I_2(x_2)=I_1(f(x_2))$. Since a discrete pixel in output image $I_2$ may not fall exactly on another pixel position or center in input image $I_1$, the discrete pixels in input image $I_1$ may be interpolated to obtain the value of $I_1(f(x_2))$. (This interpolation may use, for example, bilinear interpolation or may simply choose the nearest pixel.) For even better quality, a filtering operation may be applied to the area of $I_1$ around $f(x_2)$ to prevent aliasing, or the value may be retrieved from in a multi-resolution pyramid, as is known in the art. An advantage of backward mapping 50 is that it is unambiguous and straightforward. For every pixel in output image $I_2$, a corresponding pixel in (or outside) input image $I_1$ can be determined and resampled pixel value in input image $I_1$ computed. Accordingly, the resulting warped input image $I_1$ has no gaps or overlaps between it pixels. For many classes of mapping functions (e.g., affine and perspective), efficient exact and approximate algorithms have been developed.

Figure 4:
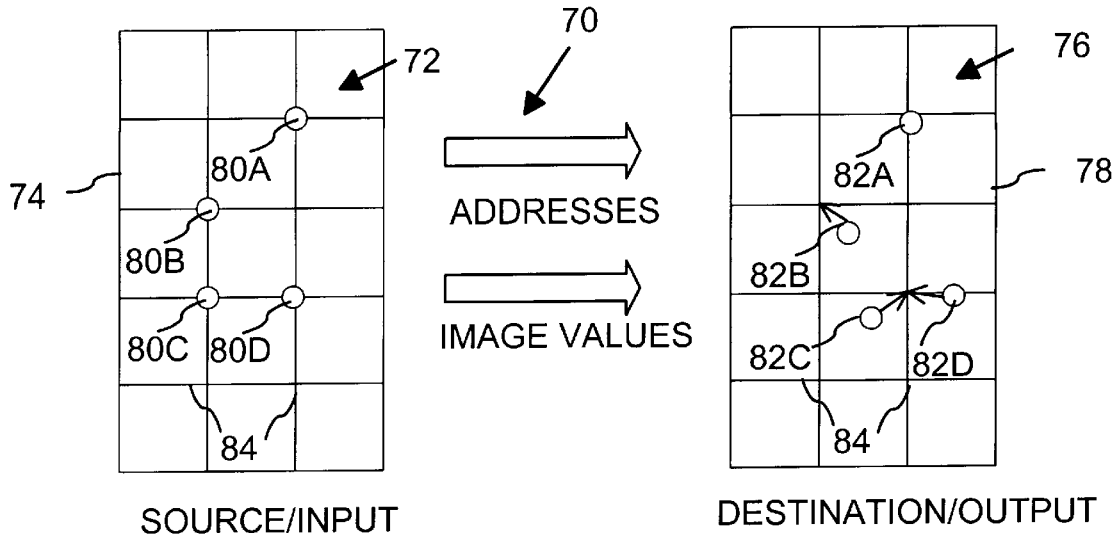
FIG. 4 is a diagram illustrating a forward mapping of a sprite in a source or an input image (e.g., image frame) to a corresponding sprite in a destination or an output image (e.g., image frame).

FIG. 4 is a diagram illustrating a forward mapping 70 of a sprite 72 in a source or an input image (e.g., image frame) 74 to a corresponding sprite 76 in a destination or an output image (e.g., image frame) 78. For purposes of illustration, sprites 72 and 76 are simple geometric shapes formed by pixels 80A–80D and pixels 82A–82D, respectively. It will be appreciated that sprites 72 and 76 could be synthetic or real (world) images having arbitrary numbers of pixels.

Pixels 80A–80D of sprite 72 are located at integer value pixel positions corresponding to actual image pixel locations that are represented by intersections of lines 84. Forward mapping 70 maps the addresses of pixels 80A–80D to corresponding respective pixels 82A–82D in sprite 76. The transformation or mapping provided by forward mapping 70 will often map pixels 82A–82D to real value pixel positions that are located between the actual image pixel locations represented by intersections of lines 84, and so pixels 82A–82D are conformed to integer pixel locations (shown by arrows). The image values of the pixels at the pixels 80A–80D are then mapped to the corresponding conformed or integer pixel locations of pixels 82A–82D.

The conforming of pixels 82A–82D may use any of a variety of conventional splatting algorithms including one pixel splats, 2×2 pixel splats, and splats with non-integer weights, or any other like algorithms. As is known in the art, the splatting. In addition, the conforming of pixels 82A–82D may also include gap filling that applies values from neighboring pixels to incidental gaps in the mapping.

Forward mapping 70 may be represented mathematically as follows. Given a source or an input image $I_1(x_1)$ and a coordinate mapping $x_2=f(x_1)$, a destination or output image $I_2(x_2)$ is represented as $I_2(f(x_1))=I_1(x_1)$. Each discrete pixel in input image $I_1$ is mapped to a corresponding pixel in output image $I_2$. However, for a general mapping f, the corresponding pixels in output image $I_2$ will often not fall exactly on another pixel center (i.e., at an integer value position). If pixels in output image $I_2$ are mapped onto the nearest actual or integer pixel locations, gaps may appear in the output image $I_2$ or several pixels in $I_1$ may map to the same region of $I_2$, thereby introducing undesirable uncertainty in the rendering of the output image $I_2$. Gaps, or patches of undefined pixels, occur when mapping contiguous input pixels to sparse positions in the output image. Overlaps occur when multiple input pixels collapse into one output pixel.

Gaps in images can be filled using simple operations, but it is difficult to distinguish an incorrect image gap caused by resampling and a correct gap due to the shape of the sprite. In general, three approaches to forward mapping have been developed. In one approach, pixels are splatted (i.e., expanded to a size larger than a single pixel) during forward mapping using kernels larger than single pixels. However, splats may cause blurring in the images, may be slower than single-pixel resampling, and may require a post-process stage to normalize pixel colors and opacities. In another approach, a depth image can be drawn using tiny triangles defined between each pixel. This can be slow, even if specialized hardware is used. In a third approach, a depth image can be simplified (with potential loss of detail), and then regular texture-mapping hardware or software invoked. However, the point of using sprites is often to avoid calling triangle rendering and texture-mapping code in the first place.

While the last two methods can take advantage of z-buffering hardware, if it is present, to correctly deal with occlusions, the first method (and the other methods in the absence of a z-buffer) require the pixels to be drawn in back-to-front order. A simple algorithm for selecting the direction of traversal in the source image (sprite) which preserves this order is described by Leonard McMillan in *A list-priority rendering algorithm for redisplaying projected surfaces*. UNC Technical Report 95-005, University of North Carolina, 1995. This ordering is used in implementations of the present invention when forward mapping is used.

When per-pixel displacements are included, the forward mapping equation now becomes $$\begin{bmatrix} w_2 x_2 \\ w_2 y_2 \\ w_2 \end{bmatrix} = H_{1,2} \begin{bmatrix} x_1 \\ y_1 \\ 1 \end{bmatrix} + d_1 e_1$$

or $$x_2 \sim H_{1,2} x_1 + d_1 e_{1,2} \tag{1}$$

where $e_{1,2}$ is called the epipole in computer vision and is obtained from the last column of $T_{1,2}$ (dropping the third, z, component). In the above equation, $x_1$ and $x_2$ represent homogeneous coordinates $(x_1, y_1, 1)$ and $(x_2, y_2, 1)$, and ~ indicates equality up to a scale.

Equation (1) can be used to forward map pixels from a sprite to a new view. Unfortunately, this entails the usual problems associated with forward mapping, e.g., the necessity to fill gaps or to use larger splatting kernels, and the difficulty in achieving proper resampling. Notice, however, that this same equation could be used to perform a backward mapping step by interchanging the 1 and 2 indices to obtain $$x_1 \sim H_{2,1} x_2 + d_2 e_{2,1} \tag{2}$$

which computes the address of a source pixel $x_1$ for a corresponding destination pixel $x_2$ having an out-of-plane displacement or depth $d_2$. The map of depths $d_2$ for the destination image are initially unknown, but can be determined by forward mapping or warping the source image depths $d_1$, as described below.

For many applications of sprites with depth, the depth map will typically vary more slowly or smoothly than the color/intensity distribution. Moreover, motion due to depth parallax will typically be smaller than motion due to the plane perspective transform. These two effects combined make small errors in forward depth mapping much less visible than errors in forward color mapping. For example, a one-pixel error during a splat after a forward mapping means that a $d_2$ value is incorrectly computed as that of its neighbor. However, if the difference in parallax implied by these two values is only a fraction of a pixel, this error will essentially be invisible. This is based on the assumptions that the depth map varies slowly and that its overall magnitude is small or comparable to the extent of the sprite. For objects like faces, or spheres (or even cubes, seen edge on), this is usually true. For objects like trees or squares floating above a plane it is usually not.

Forward mapping sprites is known to be problematic because it is slow or introduces artifacts, but for the reasons above, a forward mapping of the depth map will often not suffer the same problems. Moreover, a forward mapping would provide a mapping of the depths $d_2$, also called a depth map $d_2$, which is referenced in the backward mapping of Equation (2).

Figure 6:
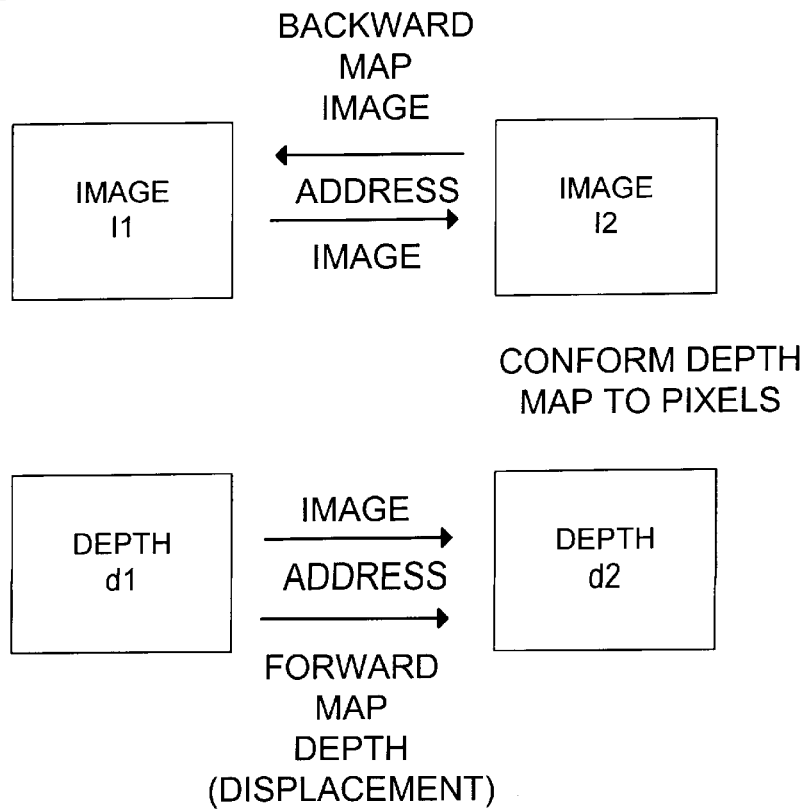
FIG. 6 is a graphical illustration of the sprite rendering method of FIG. 5.
Figure 5:
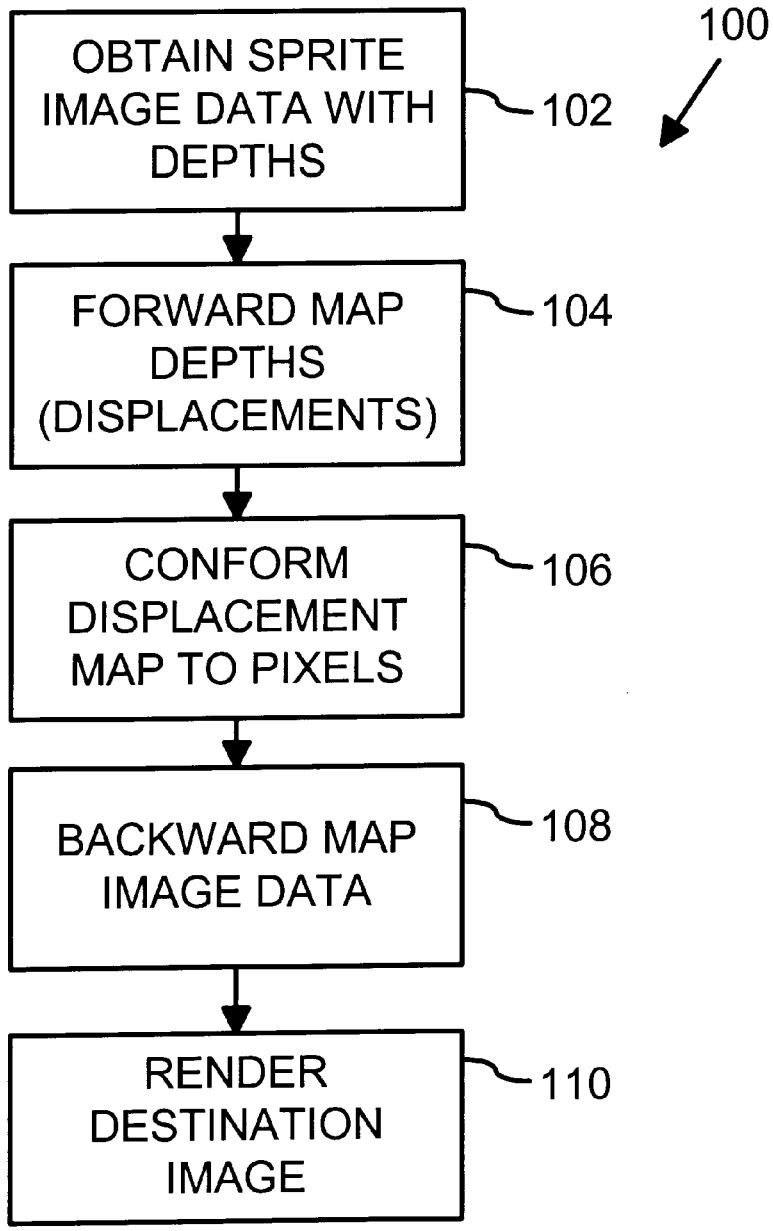
FIG. 5 is a flow diagram of a sprite rendering method that generates parallax-based offsets for application to a standard sprite renderer.

FIG. 5 is a flow diagram of a sprite rendering method 100 that generates parallax-based offsets for application to a standard sprite renderer. This parallax, or relative motion between the different sprite depths, can create a very strong impression of three-dimensionality between and within the sprites. Rendering method 100 forward maps the input or source displacement map $d_1$ to obtain an output or destination displacement map $d_2$, and then backward maps the sprite image with reference to the displacement map $d_2$ to determine for each destination pixel the address of the corresponding source pixel. FIG. 6 is a graphical illustration of rendering method 100.

Process block 102 indicates that image data $x_1$ is obtained corresponding to a sprite in an input or source frame or image. Each pixel $(x_1, y_1, 1)$ in the sprite has a depth $d_1$. The depth $d_1$ may be stored in a separate channel or as a separate image. As a separate channel, each pixel with depth is represented as $(x_1, y_1, d_1, 1)$, and as a separate image the depth or displacement map is represented $d_1(x_1, y_1)$ as the depths for all the pixels in the image. FIG. 7 is a graphical illustration of image data $x_1$ and the corresponding depth or displacement map $d_1(x_1, y_1)$ representing a spherical bump on a flat plane.

Process block 104 indicates that the depths or displacements $d_1$ in the source image are forward mapped to a destination or an output image. The forward mapping of the displacements $d_1$ may be performed with Equation (1):

$$x_2 \sim H_{1,2}x_1 + d_1 e_{1,2}$$

This forward mapping provides the coordinates $x_2$ of the pixels in the output image. In one implementation, the displacement $d_2$ of each pixel in the output image is represented as the displacement $d_1$ of the corresponding pixel in the input image as an approximation and simplification. In practice, if the sprite is not being moved or turned excessively, it may be that the w scaling values are similar between the source and destination views, so that the displacements can simply be mapped without any depth-dependant re-scaling. This is a simplification of the explicit mapping between $w_1 d_1$ and $w_2 d_2$ represented in Equation (0), which simplification is achieved by using the 2D planar perspective (i.e. homographic) transformation $H_{1,2}$ obtained by dropping the third row and last column of $T_{1,2}$. An explicit mapping would also require determination of the factor $w_2$.

Process block 106 indicates that the displacement map $d_2$ is conformed to pixel locations in the destination image. The conforming of the displacement map $d_2$ may be a simple "nearest neighbor" conformation in which each displacement $d_2$ that is not at a pixel location is shifted to the nearest actual pixel location. This type of conformation is also called a "single pixel splat."

Process block 108 indicates that a backward mapping of the sprite image pixels is performed utilizing the conformed pixel locations of the displacement map $d_2$. The backward mapping utilizes the output image displacements $d_2$ and can be performed according to Equation (2):

$$x_1 \sim H_{2,1}x_2 + d_2 e_{2,1}$$

Process block 110 indicates that the determined destination or output image is rendered relative to the destination image.

The explicit determination of the displacements $d_2$ of the pixels in the output image in process block 104 entails a matrix multiply and a division by the scaling term $w_2$. However, the displacements $d_2$ can be determined to any desired level of accuracy according to several implementations. One implementation uses only the $H_{1,2}x_1$ part of Equation (1), which is the 2D planar perspective transformation (homography), to map the displacement. This allows backward mapping to be used to map the displacement and is equivalent to ignoring the out-of-plane displacement in the forward mapping stage. This implementation produces a reasonable illusion of parallax for very small motion, but eventually breaks down for larger motions. This implementation is called "fake" depth warping.

Figure 8:
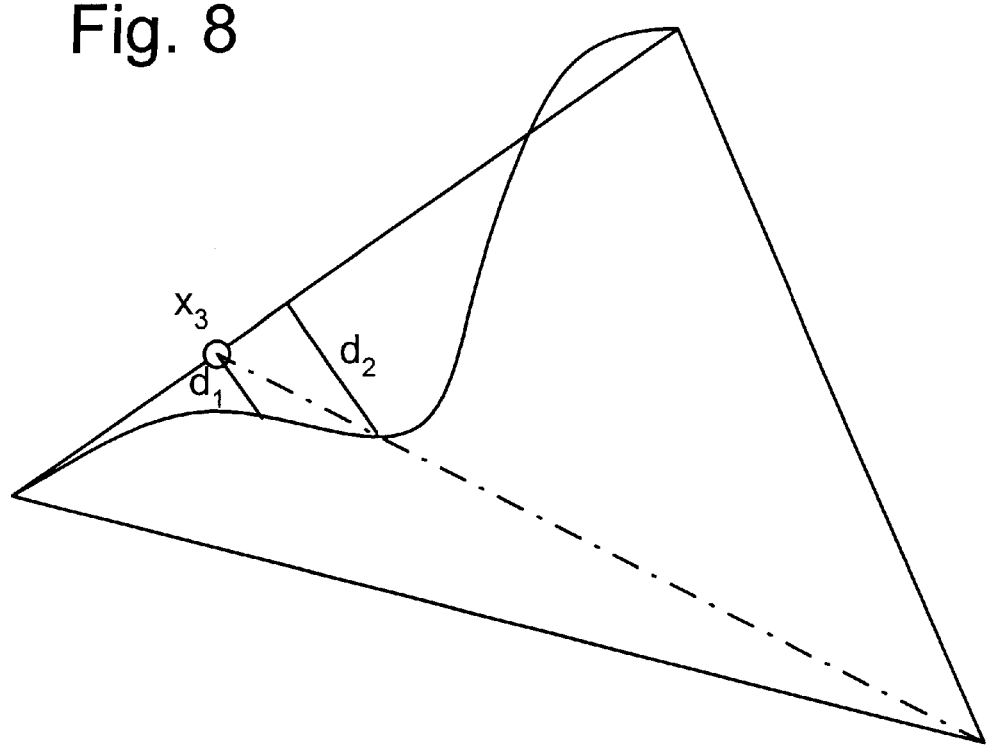
FIG. 8 illustrates different forward mappings of a displacement map.

FIG. 8 illustrates the difference between forward mapping displacement map dl with just the homography component versus a forward mapping with both portions of Equation (1). The dashed line corresponds to a viewing ray for pixel x2, which maps to pixel x3 on the sprite. The depth d1 from the pixel x3 on the projection plane Π to the sprite surface is the incorrect apparent depth that is obtained if forward mapping is omitted. The depth d2 where the viewing ray intersects the sprite surface is the correct depth obtained with the forward mapping.

Another implementation uses Equation (1) for the displacement map and a single-pixel (nearest neighbor) splat, followed by hole filling. Hole filling amounts to in-filling gaps between the pixel locations to which the displacement values are conformed and can correct errors caused by the single-pixel splat. The hole filling may cause displacement values to be filled into pixel locations outside the original sprite boundaries (i.e., the displacement values might bleed outside the original sprite boundaries). Such "bleeding" of the displacement values typically would not cause significant errors because the subsequent backward mapping stage will still compute addresses outside the active area of the sprite. This implementation gives a good impression of 3-D parallax, even for very large changes in viewing angle.

In yet another implementation the single-pixel splat of process block 106 is replaced with a 2×2 splat in which forward mapped displacements at non-integer, real pixel locations are applied to the 2×2 array of surrounding actual pixel locations (e.g., with constant weight). This implementation will typically correct gaps or holes that arise from the forward mapping whenever neighboring destination pixels do not differ by more than 1 (i.e., the maximum gap size is 1).

As an alternative to performing a forward or backward mapping in a single pass, it is sometimes possible to write the pixel mapping as a sequence of transformations, e.g., $x_1=f_{2,1}(x_2)$, $x_2=f_{3,2}(x_3)$, and to resample the image several times, i.e., $I_2(x_2)=I_1(f_{2,1}(x_2))$ and $I_3(x_3)=I_2(f_{3,2}(x_3))$ in a multipass mapping process. While repeated resampling will in general lead to poorer results due to blurring and aliasing at each step, this may still be advantageous if it significantly speeds up or simplifies each mapping step. Common examples of multipass mapping are rotations and other affine transformations implemented as multiple scanline resamplings, as is known in the art. As described below, multipass mapping is used to separate different kinds of mapping, e.g., to separate the global perspective transform applied to the sprite from the per-pixel parallax induced by the out-of-plane depth.

Figure 9:
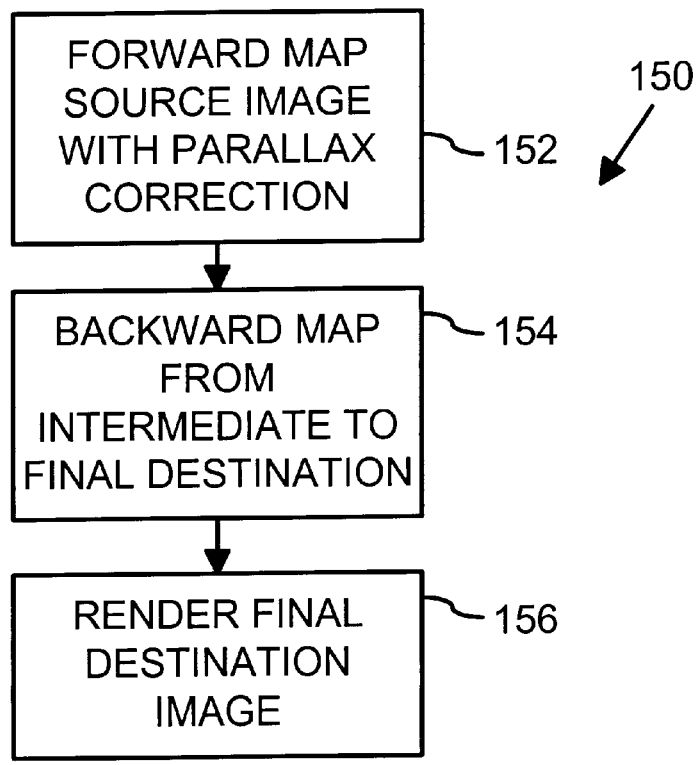
FIG. 9 is flow diagram of an alternative sprite rendering method for applying a parallax correction in a forward mapping of sprites with depth using a two-pass forward/backward mapping process.

FIG. 9 is flow diagram of an alternative sprite rendering method 150 for applying a parallax correction in a forward mapping of sprites with depth. Rendering method 150 uses a two-pass forward/backward mapping process, as illustrated in the graphical representation of FIG. 10. In the first pass, a parallax correction is applied to the color image (sprite) by a forward mapping of each pixel. In the second pass, a global perspective transform is used, so a backward map can be performed. An advantage of such a two-pass process is that the gaps introduced in the first pass may be smaller than the gaps introduced by the single-pass forward warp of rendering method 100. More specifically, the first pass introduces fewer gaps, distortions, or aliasing because smaller displacements are involved. A disadvantage is that the image is being resampled twice, which can cause aliasing and blurriness.

Process block 152 indicates that a forward mapping is performed from source image information having a parallax correction or component to an intermediate destination image. The image information having a parallax component is based upon a factoring of Equation (1), which represents forward mapping. Equation (1) can be re-written as:

$$x_2 \sim H_{1,2}(x_1+d_1 e_{1,2}^*) \quad (3)$$

where $e_{1,2}^* = H_{1,2}^{-1} e_{1,2}$. Also, as described with reference to FIG. 4, a forward mapping may be generally represented by the equation $I_2(f_{1,2}(x_1))=I_1(x_1)$, with $f_{1,2}(x_1)$ given by Equation (1). As a result, a forward mapping from a source image (1) to an intermediate destination image (3) may be generally represented by the equation $I_3(f_{1,3}(x_1))=I_1(x_1)$, with $f_{1,3}(x_1)$ given by Equation (1). But with Equation (3) being equivalent to Equation (1), this forward mapping is given by:

$$x_3 \sim X_1 + d_1 e_{1,2}^* \quad (4)$$

This represents an approximation of an affine transformation obtained from the forward mapping transform. The forward mapping of process block 152 includes conforming the forward mapped values to actual or integer pixel locations, which step is separately recited in process 100.

Process block 154 indicates that a conventional backward mapping, such as for a flat sprite, is performed from the intermediate destination image to a resultant destination image. As described with reference to FIG. 3, a backward mapping may be generally represented by the equation $I_2(x_2)=I_1(f_{2,1}(x_2))$. As a result, a backward mapping from the intermediate destination image (3) to the resultant destination image (2) may be generally represented by the equation $I_3(x_3)=I_2(f_{3,2}(x_3))$, with $f_{3,2}(x_3)$ given by:

$$x_3 \sim H_{1,2}^{-1} x_2 \quad (5)$$

which represents a perspective transform (homography) that is readily performed with conventional texture mapping hardware or software.

Process block 156 indicates that the determined destination or output image is rendered relative to the destination image.

The above computations of destination addresses generally involve a division per pixel because $x_1$ and $x_2$ are homogeneous coordinates. This may be acceptable in applications in which rendering hardware includes a divider (e.g., as a part of a texture mapping unit). However, in many situations (e.g., software rendering, or designing new hardware), it may be preferable to avoid these extra division calculations to increase the speed of the rendering. This is particularly so in a multi-pass process like rendering method 150 because each pass includes a division operation.

Elimination of division calculations by approximating perspective mappings (e.g., process block 154) with local affine (or quadratic) approximations is known in the art. An alternative implementation of rendering process 150 provides an affine approximation of the parallax transformation $$x_2 \sim x_1 + d_1 e_{1,2}$$

where $x_1$ and $x_2$ are homogeneous coordinates. This equation in its expanded form is given by:

$$\begin{bmatrix} w_2 x_2 \\ w_2 y_2 \\ w_2 \end{bmatrix} = \begin{bmatrix} x_1 \\ y_1 \\ 1 \end{bmatrix} + d_1 \begin{bmatrix} ex \\ ey \\ ew \end{bmatrix}$$

One way to eliminate the division involved in this computation is to replace the third element of $e_{1,2}$ with 0, which eliminates the normalizing division by $w_2$. A better approximation to $e_{1,2}$ can be obtained by expanding $$x_2 = (x_1 + d_1 e_x)/(1 + d_1 e_z)$$
$$= (x_1 + d_1 e_x)(1 - d_1 e_z + \ldots)$$
$$\approx x_1 + d_1(e_x - x_1 e_z).$$

Thus, a better affine approximation to $e_{1,2}$ is $(e_x - x_1^c e_z, e_y - y_1^c e_z, 0)$, where $(x_1^c, y_1^c)$ is the center of the sprite. Both of these approximations are equivalent to moving the perspective vanishing point or epipole to a point at infinity.

In all of these cases, however, the displacements will be parallel (which may not be noticeable, if the subsequent homography gives a strong sense of foreshortening in which features that are farther away appear smaller). The parallel displacement vector may be noticeable, however, if a large amount of looming occurs, such as for a square floating in front of a plane as shown in FIG. 11. Note that when using affine displacements, only a single traversal ordering is required for forward mapping, instead of McMillan's four quadrant traversal (FIG. 4). This is because the epipole will never fall inside the source image.

A third implementation is to build a look-up table for affine displacements as a function of $d_1$, which could account for some of the foreshortening that occurs during perspective transforms. For example, the division by the term $(1+d_1 e_z)$ in the initial expansion of $e_{1,2}$ could be replaced with a multiplication by the inverse of the term: $(1+d_1 e_z)^{-1}$. A lookup table (e.g., 256 entries) is computed for the inverse term $(1+d_1 e_z)^{-1}$ for all the values of $d_1$. This implementation would probably not be feasible if the transformation equation is not factored, i.e., if the denominator in the expansion of Equation (2) is of the form $(h_{20}x+h_{21}y+h_{22}+d_1 e_z)$, because too many entries would be required.

Figure 12:
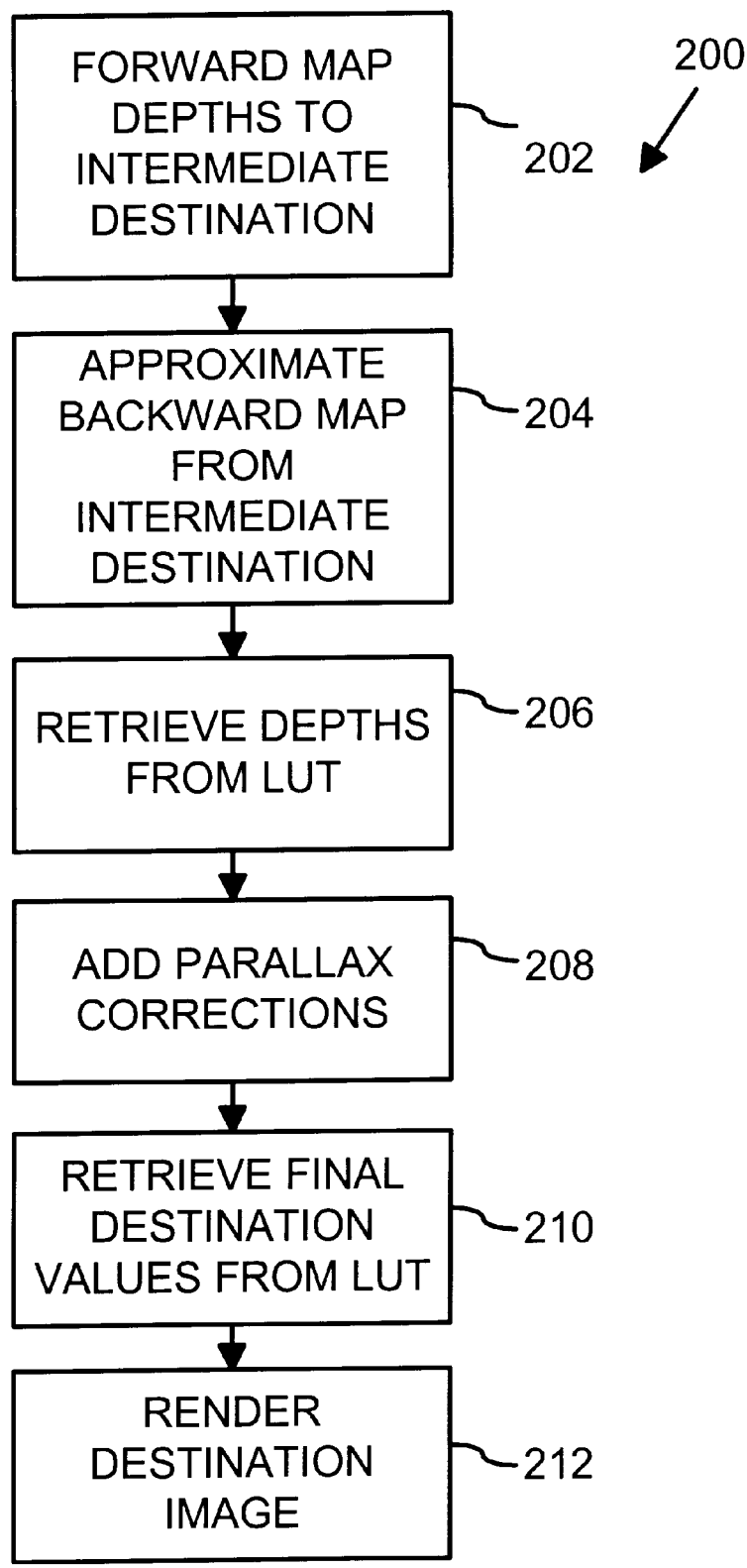
FIG. 12 is a flow diagram of another alternative sprite rendering method.

FIG. 12 is a flow diagram of a sprite rendering method 200 that is another alternative implementation of rendering method 100 of FIG. 5. With regard to rendering method 100, rendering method 200 replaces the forward mapping of $d_1$ with the forward/backward algorithm of rendering method 150 (FIG. 9). More specifically, the parallax correction of Equation (4) is applied to $d_1$, and the homography of Equation (5) is applied simultaneously with the backward sprite mapping, in accordance with various of the other alternative implementations of method 150.

Process block 202 indicates that the depth map $d_1$ is forward mapped to an intermediate destination depth map $d_3$, as represented by the general equation $d_3(f_{1,3}(x_1))=d_1(x_1)$. In this implementation, $f_{1,3}(x_1)$ is given by Equation (4) or some affine approximation. The forward mapping of process block 202 includes conforming the forward mapped values to actual or integer pixel locations, which step is separately recited in process 100.

Process block 204 indicates that for each destination pixel $x_2$, an approximated backward mapping is determined from the corresponding pixel $X_3$ in the intermediate destination image. The approximated backward mapping may be determined by the equation: $X_3 \sim H_{1,2}^{-1} x_2$ or another affine or quadratic approximation. This mapping is referred to as $f_{2,3}(x_2)$.

Process block 206 indicates that the values of $d_2(x_2)=d_3(f_{2,3}(x_2))$ are retrieved from the intermediate destination depth map $d_3$ using the coordinate $x_3$ referenced in process block 204.

Process block 208 indicates that the parallax corrections are added to $x_3$ to obtain $x_1$, as given by Equation (2):

$$x_1 \sim H_{2,1} x_2 + d_2 e_{2,1} = x_3 + d_2 e_{2,1} \qquad (6)$$

Process block 210 indicates that the final values of the pixels in the source image, $I_1(x_1)$, are retrieved from a look-up table listing displacements as a function of depths d.

Process block 212 indicates that the determined destination or output image is rendered relative to the destination image.

The step of process block 202 may be omitted, which would result in the faster, but poorer looking, "pure" backward mapping process. In the steps of process blocks 204 and 208, affine approximations to the true homogeneous coordinate value computation can be used. The affine approximations would remove division calculations from the inner loops of rendering method 200, but at the cost of making the parallax vectors all parallel. In the step of process block 206, a nearest-neighbor resampling of the depth map could be used, while in the step of process block 210 full bilinear or trilinear resampling could be used. It will be appreciated, however, that any desired tradeoff between accuracy and speed can be made, as is known in the art.

Rendering method 200 presupposes the ability to modify the basic perspective texture-mapping software or hardware to include a per-pixel parallax correction. In those cases where the texture mapping component cannot be modified in this way, rendering method 100 would instead be used.

The forward mapping of the depth map in rendering method 100 (FIG. 5) has some limitations. In one implementation, the value of $d_1$ is copied to $d_2$ at its forward-mapped location, which does not result in the correct map $d_2(x_2)$. Also, rendering method 100 includes converting the displacements in the displacement maps into motion vectors, which are determined by subtraction between a pair of vectors. The conversions are performed twice in process 100, first when the forward mapped depths are determined at process block 104 and then when backward mapped image data are determined at process block 108. These conversions may involve per-pixel divisions, for maximum accuracy, or at the least involve table look-ups and multiplies. An alternative approach is therefore to forward-map the motion vectors:

$$u_{1,3} = x_3 - x_1 = f_{1,3}(x_1) - x_1$$

to obtain an inverse motion vector map $u_{3,1}(x_3)$. The process is otherwise analogous to that of rendering method 200 (FIG. 12), but would be applied to the motion vectors rather than the displacements or depths (i.e., values or scalars). The resulting equations representing the application of process 200 to the motion vectors are as follows.

In process block 202, the source motion vector map $u_{1,3}$ is forward mapped to an intermediate motion vector map $u_{3,1}$, as represented by general equation $u_{3,1}(f_{1,3}(x_1))=u_{1,3}(x_1)$, with $f_{1,3}(x_1)$ based upon Equation (4) or some approximation (e.g., affine).

In process block 204, an approximated backward mapping (called $f_{2,3}(x_2)$) may be determined by the equation $x_3 \sim H_{1,2}^{-1} x_2$, or whatever affine or quadratic approximation is being used in the backward mapping, for each destination pixel $x_2$.

In process block 208, the parallax correction is added to $x_3$ to obtain $x_1$, as given by the equation:

$$x_1 = x_3 + u_{3,1}$$

In process block 210, the final values of $I_1(x_1)$ are retrieved from the source motion vector map $u_{1,3}$.

This algorithm requires only a single computation of parallax vectors, and is potentially more accurate than forward mapping the depth map. The potential disadvantage is that the motion vector map $u_{3,1}$ is probably larger (in terms of bytes per pixel) than the depth map $d_3$. However, this problem can be mitigated by representing $u_{3,1}$ at a lower resolution and then interpolating it (say bilinear doubling) in the step of process block 208.

FIGS. 13A–13C are graphical illustrations showing images rendered with a conventional flat sprite (i.e., without depth correction) (FIG. 13A) and images rendered with sprites having depth corrections according to two of the implementations described above (FIGS. 13B and 13C). FIG. 13A shows three images rendered with a conventional flat sprite. The first (top) image includes only a slight tilt, and the second (middle) and third (bottom) images show successively greater tilts that correspond to destination images mapped from the first image. Each of these images appears flat, with the flatness being particularly pronounced in the third image.

FIG. 13B shows images rendered with depth correction that does not include forward mapping of depth, referred to as fake depth warping. This type of depth correction was described above as a modified implementation of sprite rendering process 100. The first (top) image includes only a slight tilt, and the second (middle) and third (bottom) images show successively greater tilts that correspond to destination images mapped from the first image. The middle image with a moderate tilt shows improved depth characteristics over the images in the left side column without depth correction. The approximate nature of this implementation is shown, however, in the bottom image of the middle column. This image shows that the approximation breaks down at larger tilts. Accordingly, this implementation produces a reasonable illusion of parallax for very small motion, but eventually breaks down for larger motions.

FIG. 13C shows images rendered with depth correction that includes a forward mapping. More specifically, the depth correction in the left side column uses forward depth mapping and backward color mapping, with the forward map applied to an 8-bit displacement map. This depth correction implementation also uses nearest-neighbor, single pixel splats, followed by an iterative gap filling step (replacing empty pixels with an average of their non-empty neighbors). An affine approximation to the parallax transformation is used, i.e., the epipole is computed as the parallax corresponding to a single step in d at the center of the sprite. For speed, a 256-entry lookup table is used to map from d values to offset vectors. For the same tilts as in FIGS. 13A and 13B, the depth correction that includes forward mapping as illustrated in FIG. 13C gives a compelling impression of 3-D parallax, even for very large changes in viewing angle.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A computer method of determining a selected sprite image that includes plural pixels that have depths relative to a selected plane, comprising:
   obtaining a source sprite image that is related to the selected sprite image and includes plural pixels that have depths relative to a source plane;
   forward mapping from the source sprite image to forward mapped depths of the selected sprite image; and
   backward mapping the selected sprite image to the source sprite image with respect to the forward mapped depths of the selected sprite image.

2. The method of claim 1 in which the pixels of the selected sprite image are at integer pixel addresses and the method further comprises conforming the forward mapped depths of the selected sprite image to the integer pixel addresses.

3. The method of claim 2 in which conforming the forward mapped depths of the selected sprite image to the integer pixel addresses includes a single pixel splat of the forward mapped depths.

4. The method of claim 2 in which conforming the forward mapped depths of the selected sprite image to the integer pixel addresses includes hole filling the forward mapped depths.

5. The method of claim 1 in which the forward mapping includes a two-dimensional planar perspective transformation.

6. The method of claim 5 in which the forward mapping includes forward mapping the depths of the source sprite image.

7. The method of claim 5 in which the forward mapping does not include forward mapping the depths of the source sprite image.

8. The method of claim 1 further comprising rendering the selected sprite image on a computer display screen.

9. A computer readable medium having stored thereon software for determining a selected sprite image that includes plural pixels that have depths relative to a selected plane, comprising:
   software instructions for obtaining a source sprite image that is related to the selected sprite image and includes plural pixels that have depths relative to a source plane;
   software instructions for forward mapping from the source sprite image to forward mapped depths of the selected sprite image; and
   software instructions for backward mapping the selected sprite image to the source sprite image with respect to the forward mapped depths of the selected sprite image.

10. The medium of claim 9 in which the pixels of the selected sprite image are at integer pixel addresses and the medium further comprises software instructions for conforming the forward mapped depths of the selected sprite image to the integer pixel addresses.

11. The medium of claim 9 in which the software instructions for the forward mapping includes a two-dimensional planar perspective transformation.

12. The medium of claim 11 in which the software instructions for the forward mapping includes software instructions for forward mapping the depths of the source sprite image.

13. The medium of claim 11 in which the software instructions for the forward mapping does not include software instructions for forward mapping the depths of the source sprite image.

14. The medium of claim 9 further comprising rendering the selected sprite image on a computer display screen.

15. A computer method of determining a selected sprite image that includes plural pixels that have depths relative to a selected plane, comprising:
   obtaining a source sprite image that is related to the selected sprite image and includes plural pixels that have depths relative to a source plane;
   forward mapping from the depths of the source sprite image to forward mapped depths of an intermediate sprite image; and
   backward mapping the selected sprite image to the intermediate sprite image with respect to the forward mapped depths of the intermediate sprite image.

16. The method of claim 15 in which the pixels of the intermediate sprite image are at integer pixel addresses and the method further comprises conforming the forward mapped depths of the intermediate sprite image to the integer pixel addresses.

17. The method of claim 15 in which the backward mapping includes an inverse of a two-dimensional planar perspective transformation.

18. The method of claim 15 in which the forward mapping includes forward mapping the depths of the source sprite image.

19. The method of claim 15 in which the forward mapping includes division calculations with denominators that include the depths of the source sprite image and the denominators for the division calculations are included in a look-up table based upon the depths of the source sprite image.

20. The method of claim 15 in which the forward mapping is represented by an approximation of an affine transformation.

21. The method of claim 20 in which the source sprite image includes a center and the approximation of the affine transformation is with respect to the center of the source sprite image.

22. The method of claim 15 further comprising rendering the selected sprite image on a computer display screen.

23. A computer readable medium having stored thereon software for determining a selected sprite image that includes plural pixels that have depths relative to a selected plane, comprising:
  software instructions for obtaining a source sprite image that is related to the selected sprite image and includes plural pixels that have depths relative to a source plane;
  software instructions for forward mapping from the depths of the source sprite image to forward mapped depths of an intermediate sprite image; and
  software instructions for backward mapping the selected sprite image to the intermediate sprite image with respect to the forward mapped depths of the intermediate sprite image.

24. The medium of claim 23 in which the pixels of the intermediate sprite image are at integer pixel addresses and the medium further comprises software instructions for conforming the forward mapped depths of the intermediate sprite image to the integer pixel addresses.

25. The medium of claim 23 in which the software instructions for the backward mapping include an inverse of a two-dimensional planar perspective transformation.

26. The medium of claim 23 in which the software instructions for the forward mapping includes software instructions for forward mapping the depths of the source sprite image.

27. The medium of claim 23 in which the software instructions for forward mapping include division calculations with denominators that include the depths of the source sprite image and the denominators for the division calculations are included in a look-up table based upon the depths of the source sprite image.

28. The medium of claim 23 in which the software instructions for forward mapping includes a look-up table for affine displacements as a function of the depths of the source sprite image.

29. The medium of claim 23 further comprising software instructions for rendering the selected sprite image on a computer display screen.

30. A computer method of determining a selected sprite image that includes plural pixels that have depths relative to a selected plane, comprising:
  obtaining a source sprite image that is related to the selected sprite image and includes plural pixels that have depths relative to a source plane and motion vectors representing differences between the plural pixels of the source sprite image and plural pixels of an intermediate sprite image in which the plural pixels have addresses;
  forward mapping the motion vectors from the source sprite image to the intermediate sprite image; and
  backward mapping addresses of pixels in the intermediate sprite image to the selected sprite image with respect to the forward mapped motion vectors.

31. The method of claim 30 further comprising adding a parallax correction to the addresses of pixels in the intermediate sprite image.

32. The method of claim 30 in which the backward mapping includes an approximation of an affine transformation.

33. A computer readable medium having stored thereon software for determining a selected sprite image that includes plural pixels that have depths relative to a selected plane, comprising:
  software instructions for obtaining a source sprite image that is related to the selected sprite image and includes plural pixels that have depths relative to a source plane and motion vectors representing differences between the plural pixels of the source sprite image and plural pixels of an intermediate sprite image in which the plural pixels have addresses;
  software instructions for forward mapping the motion vectors from the source sprite image to the intermediate sprite image; and
  software instructions for backward mapping addresses of pixels in the intermediate sprite image to the selected sprite image with respect to the forward mapped motion vectors.

34. A computer method of determining a selected sprite image that includes plural pixels that have depths relative to a selected plane, comprising:
  obtaining a source sprite image that is related to the selected sprite image and includes plural pixels that have depths relative to a source plane;
  forward mapping from the depths of the source sprite image to forward mapped depths of plural pixels in an intermediate sprite image in which the plural pixels have addresses;
  approximating a backward mapping from the selected sprite image to addresses of pixels in the intermediate sprite image with respect to the forward mapped depths of the intermediate sprite image; and
  adding a parallax correction to the addresses of pixels in the intermediate sprite image.

35. The method of claim 34 in which the backward mapping includes an inverse of a two-dimensional planar perspective transformation.

36. The method of claim 34 further comprising retrieved from a look-up table listing displacements as a function of depths final values of the pixels in the source image sprite.

37. A computer readable medium having stored thereon software for determining a selected sprite image that includes plural pixels that have depths relative to a selected plane, comprising:
  software instructions for obtaining a source sprite image that is related to the selected sprite image and includes plural pixels that have depths relative to a source plane;
  software instructions for forward mapping from the depths of the source sprite image to forward mapped depths of plural pixels in an intermediate sprite image in which the plural pixels have addresses;
  software instructions for approximating a backward mapping from the selected sprite image to addresses of pixels in the intermediate sprite image with respect to the forward mapped depths of the intermediate sprite image; and
  adding a parallax correction to the addresses of pixels in the intermediate sprite image.

* * * * *